March 12, 1929.   W. WEBB   1,704,778
CREAM SEPARATOR DRIVING MEANS
Filed March 9, 1928
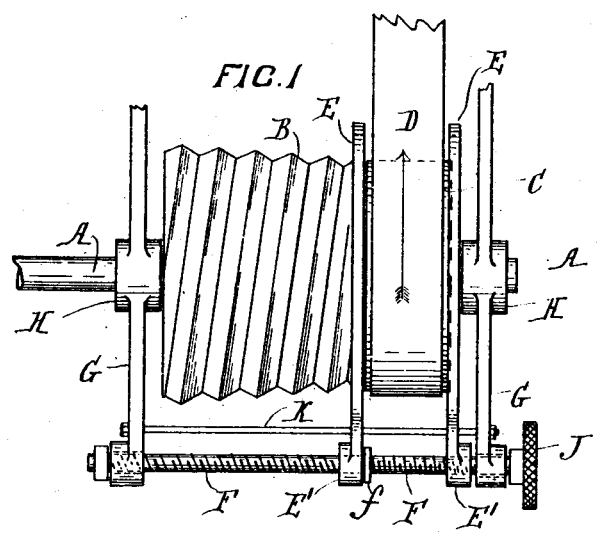
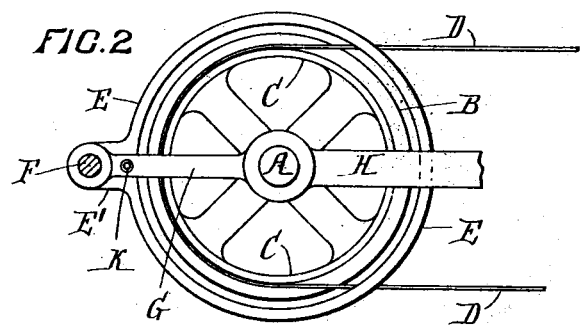
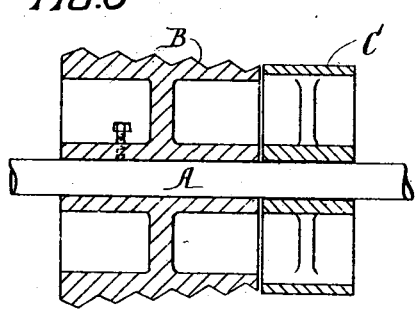
Inventor
Walter Webb
By
Attorney Patented Mar. 12, 1929.

1,704,778

UNITED STATES PATENT OFFICE.

WALTER WEBB, OF WHANGAREI, NEW ZEALAND.

CREAM-SEPARATOR DRIVING MEANS.

Application filed March 9, 1928, Serial No. 260,468, and in New Zealand June 29, 1927.

This invention relates to improved driving means for use in the operation of cream separators and which means are designed to provide for the drive of the separator mechanism being taken gradually from the driving belt so that no shock is given the separator mechanism. They also provide for any shocks in transmission being taken up by allowing of the driving belt slipping.

The invention consists in the combination with the separator's driving gear spindle, of a loose and a fast pulley mounted side by side thereon and which fast pulley is made of special shape in order to obtain the results beforementioned. Such shape provides that the peripheral surface of the fast pulley is made to slope to an increasing diameter from the inner edge, adjacent to the loose pulley, to its outer edge, and also is made with a helical, or screw thread groove extending round and across the full surface area thereof. The said groove is made of opposite hand to the direction of rotation of the pulley and travel of the belt.

The invention also embodies the combination with these pulleys of a belt guide or striker of novel form designed in its operation to allow for the driving belt having unimpeded movement when passing from the loose to the fast pulley and climbing on to the latter.

The invention is illustrated in the accompanying drawings, in which:—

Figure 1 is a plan of the driving means and belt guide.

Figure 2 is an outer end elevation thereof, a hand wheel being removed.

Figure 3 is a vertical longitudinal section through the pulleys.

A is the spindle by which the drive is transmitted to the separator.

B is the fast pulley and C the loose pulley mounted side by side upon the spindle A.

D is the driving belt.

In this invention the said fast pulley B is made with its outer peripheral surface tapering from its edge adjacent to the loose pulley, so that the pulley's outside diameter correspondingly increases, and with such tapered surface formed with a helical groove extending round and across its full width, as shown in the drawings. This groove runs reversely to the direction of the pulley's rotation. The edge of this pulley adjacent to the loose pulley is of the same diameter as the loose pulley, so that the driving belt D may pass from one pulley to the other when actuated by its guide.

In the operation of this drive, as the belt is forced by its guide to move from the loose pulley C on to the fast pulley B, it will, by reason of the taper, gradually engage the fast pulley to overcome the inertia of the appliance being driven and will be retarded somewhat by the action of the helical groove forming a reverse screw so that it will slip and catch again, until finally the full drive is taken up. Likewise any shock in the drive transmission will be allowed for by the facility for the belt slipping back upon the pulley's tapered and screwed surface.

The belt guide, or shifting means, is formed by two circular rings E that are provided to encircle the pulleys B and C and each of which rings is attached to a boss E' that is formed with a female screw threaded bore. A screw rod F is provided to screw through both bosses and such rod is carried in suitable bearings so that it extends parallel with the spindle A and is held from longitudinal movement. In the drawings this rod is shown as being carried in bearer brackets G extending from the main spindle bearings H. Its outer end is provided with a hand wheel J for use in turning it.

The guide rings E are retained in position around the pulleys, and are kept from turning on the rod by any approved means that will permit also of their movement along the pulley's widths, as for instance by sliding on the rod K arranged to extend between the brackets G.

The rod F has the guide rings E disposed upon it at such a distance apart as to allow for the driving belt D being accommodated between them, but the outer portion of the rod's length on which the outer ring moves in its travel from the outer to the inner edge of the loose pulley, is made with a screw the pitch of which is slower than is the pitch of the portion on which the inner ring is mounted. Conveniently the relative ratio is two to one, that is the outer portion is half as quick as the inner portion. The respective bosses E' are correspondingly threaded.

This means that with the guide rings positioned to retain the belt D upon the loose pulley, each ring is at the outer end of its limit of movement, the two rod portions being, if necessary, divided by the small collar $f$. On the rod then being turned to cause the belt to be forced on to the fast pulley, the inner guide will travel twice the distance of the outer guide in the same time so that it will leave an unimpeded way for the belt to climb on to the fast pulley. In shifting the belt back from the fast to the loose pulley, the reverse action takes place.

I claim:—

1. Belt actuated driving means for use with a cream separator, comprising a driving spindle and a loose and a fast pulley mounted side by side on said spindle, said fast pulley having an outer coned surface increasing in diameter from the edge adjacent the loose pulley to the edge distant therefrom, and being provided on said coned surface with a helical groove extending around and across its width.

2. Apparatus as set forth in claim 1 characterized by the provision of a fast coned pulley provided with a helical groove extending around and across its entire width and being of opposite hand to the direction of rotation of the pulley.

3. In apparatus as set forth in claim 1, belt guide means for transferring a belt from one pulley to the other, said guide means comprising two guide rings disposed around said pulleys, a screw-threaded rod extending parallel with said driving spindle and through said rings, the threaded portions of said rod passing through the respective rings having a relatively fast and slow pitch, and means for rotating said rod, whereby said guide rings are adapted to travel along said rod at relatively different speeds.

In testimony whereof, I affix my signature.

WALTER WEBB.